(12) United States Patent
Komatsu et al.

(10) Patent No.: US 8,035,424 B2
(45) Date of Patent: Oct. 11, 2011

(54) AC-COUPLED INTERFACE CIRCUIT

(75) Inventors: Yoshihide Komatsu, Osaka (JP); Tsuyoshi Ebuchi, Osaka (JP); Satoshi Hori, Osaka (JP); Takashi Hirata, Osaka (JP); Junji Nakatsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 12/526,227

(22) PCT Filed: Jul. 23, 2007

(86) PCT No.: PCT/JP2007/064432
§ 371 (c)(1),
(2), (4) Date: Aug. 6, 2009

(87) PCT Pub. No.: WO2008/099523
PCT Pub. Date: Aug. 21, 2008

(65) Prior Publication Data
US 2010/0321069 A1    Dec. 23, 2010

(30) Foreign Application Priority Data
Feb. 14, 2007   (JP) ................................ 2007-033735

(51) Int. Cl.
*H03B 1/00*    (2006.01)
(52) U.S. Cl. ..................... 327/108; 327/594; 327/595
(58) Field of Classification Search .................. None
See application file for complete search history.

(56) References Cited

U.S. PATENT DOCUMENTS

| | | | |
|---|---|---|---|
| 5,050,187 A * | 9/1991 | Ichie | 375/257 |
| 5,959,472 A | 9/1999 | Nagamatsu et al. | |
| 6,597,731 B1 * | 7/2003 | Shuholm | 375/220 |
| 6,714,558 B1 * | 3/2004 | Patel et al. | 370/445 |
| 6,895,535 B2 * | 5/2005 | Sunter et al. | 714/704 |
| 7,061,283 B1 * | 6/2006 | Ghia et al. | 327/108 |
| 7,460,585 B2 * | 12/2008 | Vorenkamp | 375/219 |
| 2006/0008075 A1 | 1/2006 | Scott et al. | |
| 2006/0055379 A1 | 3/2006 | Yamamoto | |

FOREIGN PATENT DOCUMENTS

| | | |
|---|---|---|
| JP | 60-014547 | 1/1985 |
| JP | 05-037504 | 2/1993 |
| JP | 8-502862 T | 3/1996 |
| JP | 10-051292 | 2/1998 |
| JP | 3419359 | 6/2003 |
| JP | 3699764 | 7/2005 |
| JP | 2006-060320 | 3/2006 |
| JP | 2006-115455 | 4/2006 |
| WO | WO 92/17966 | 10/1992 |

* cited by examiner

*Primary Examiner* — An Luu
(74) *Attorney, Agent, or Firm* — McDermott Will & Emery LLP

(57) ABSTRACT

An AC-coupled interface circuit on a semiconductor integrated circuit apparatus performing a bidirectional data transfer via a differential transmission line includes a differential driver, a differential receiver and a potential setting section. The differential driver includes a pair of output terminals connected to a pair of signal lines. The differential receiver includes a pair of input terminals connected to the pair of signal lines. In a data transmission operation, the differential driver converts transmit data to a differential signal to output the differential signal. In a data reception operation, the differential receiver receives a differential signal transferred to the pair of signal lines and converts the differential signal to receive data. The potential setting section sets a potential of the pair of signal lines to a predetermined stable potential before the differential signal is transferred to the pair of signal lines.

7 Claims, 16 Drawing Sheets

AC-COUPLED INTERFACE CIRCUIT

RELATED APPLICATIONS

This application is the U.S. National Phase under 35 U.S.C. §371 of International Application No. PCT/JP2007/064432, filed on Jul. 23, 2007, which in turn claims the benefit of Japanese Application No. 2007-033735, filed on Feb. 14, 2007, the disclosures of which Applications are incorporated by reference herein.

TECHNICAL FIELD

The present invention relates to an interface circuit and, more particularly, to an interface circuit AC-coupled to a differential cable.

BACKGROUND ART

In recent years, a serial differential transfer method has been widely known in the art as a data transfer method between LSIs, in which parallel data is converted to serial data, and the serial data is transferred as a small-amplitude differential signal. In a serial differential transfer method, data can be transferred at a high speed with two terminals, and it is therefore possible not only to reduce the power consumption and the circuit area but also to improve the anti-noise property and suppress the noise generation, thus ensuring a high reliability. With a serial differential transfer method, a clock recovery method can be employed, whereby the clock signal can be incorporated in the data signal. This eliminates the need for a line for transferring the clock signal, thereby reducing the number of cables, and eliminating the need for timing compensation between the clock signal and the data signal, and it is therefore possible to improve the signal quality.

Data transfer systems have been used not only in electric appliances such as TV sets and DVDs, but also in environments where jump-in noise is likely to occur, such as in automobiles. For example, there is a system in which a video signal is transferred from a camera unit for taking an image at the rear of an automobile to a monitor unit installed at the driver's seat, and the image at the rear of the automobile is displayed on the monitor unit, thereby assisting in backing the automobile. Under such circumstances, LSIs may break down due to ESD (Electro-Static Discharge) such as jump-in noise. Therefore, it is preferred that the differential cable and the LSI are AC-coupled together with a capacitor on the substrate wiring so as to prevent LSI breakdown due to ESD and to thus improve the LSI's resistance to a disconnection failure, as disclosed in Japanese Patent No. 3699764 (Patent Document 1), Japanese Patent No. 3419359 (Patent Document 2), Japanese Published Patent Application No. H05-37504 (Patent Document 3).

Patent Document 1: Japanese Patent No. 3699764
Patent Document 2: Japanese Patent No. 3419359
Patent Document 3: Japanese Published Patent Application No. H05-37504

DISCLOSURE OF THE INVENTION

Problems to be Solved by the Invention

With a conventional AC-coupled interface circuit, however, since the amount of time (stabilization time) required before the amplitude of the differential signal stabilizes is dependent on the resistance value of the terminator and the capacitance value of the capacitive coupling, it is difficult to shorten the stabilization time, and it is difficult to transfer a large amount of information within a short period of time. Therefore, conventional interface circuits have been used mainly in unidirectional data transfers.

In view of this, an objective of the present invention is to shorten the amount of time (stabilization time) required before the amplitude of the differential signal stabilizes to an appropriate value after the start of the output of the differential signal, while ensuring a resistance to LSI breakdown due to ESD.

Means for Solving the Problems

According to one aspect of this invention, an AC-coupled interface circuit is an AC-coupled interface circuit mounted on a semiconductor integrated circuit apparatus performing a bidirectional data transfer via a differential cable, including: a pair of signal lines configured to transfer a differential signal; a pair of capacitors configured to AC-couple the pair of signal lines with the differential cable; a resistor element configured to connect the pair of signal lines to each other; a differential driver including a pair of output terminals connected to the pair of signal lines, wherein in a data transmission operation, the differential driver receives transmit data and converts the transmit data to a differential signal to output the differential signal; a differential receiver including a pair of input terminals connected to the pair of signal lines, wherein in a data reception operation, the differential receiver receives a differential signal transferred to the pair of signal lines and converts the differential signal to receive data; and a potential setting section configured to set a potential of the pair of signal lines to a predetermined stable potential before the differential signal is transferred to the pair of signal lines.

With such an interface circuit, it is possible to shorten the amount of time (stabilization time) required before the amplitude of the differential signal becomes equal to an appropriate value while ensuring a resistance to LSI breakdown due to ESD (Electro-Static Discharge).

Preferably, the differential driver starts outputting the differential signal so that an amplitude of the differential signal gradually increases.

With such an interface circuit, it is possible to prevent the potential of the pair of signal lines from fluctuating rapidly, and it is possible to further shorten the stabilization time.

Preferably, the differential driver finishes outputting the differential signal so that the amplitude of the differential signal gradually decreases.

With such an interface circuit, the potential of the pair of signal lines can be brought back to the stable potential, and it is therefore possible to start the output of the differential signal without performing the precharge operation in the next data transmission operation.

Effects of the Invention

As described above, it is possible to shorten the amount of time (stabilization time) required before the amplitude of the differential signal becomes equal to an appropriate value, while ensuring a resistance to LSI breakdown due to ESD (Electro-Static Discharge).

Figure 1:
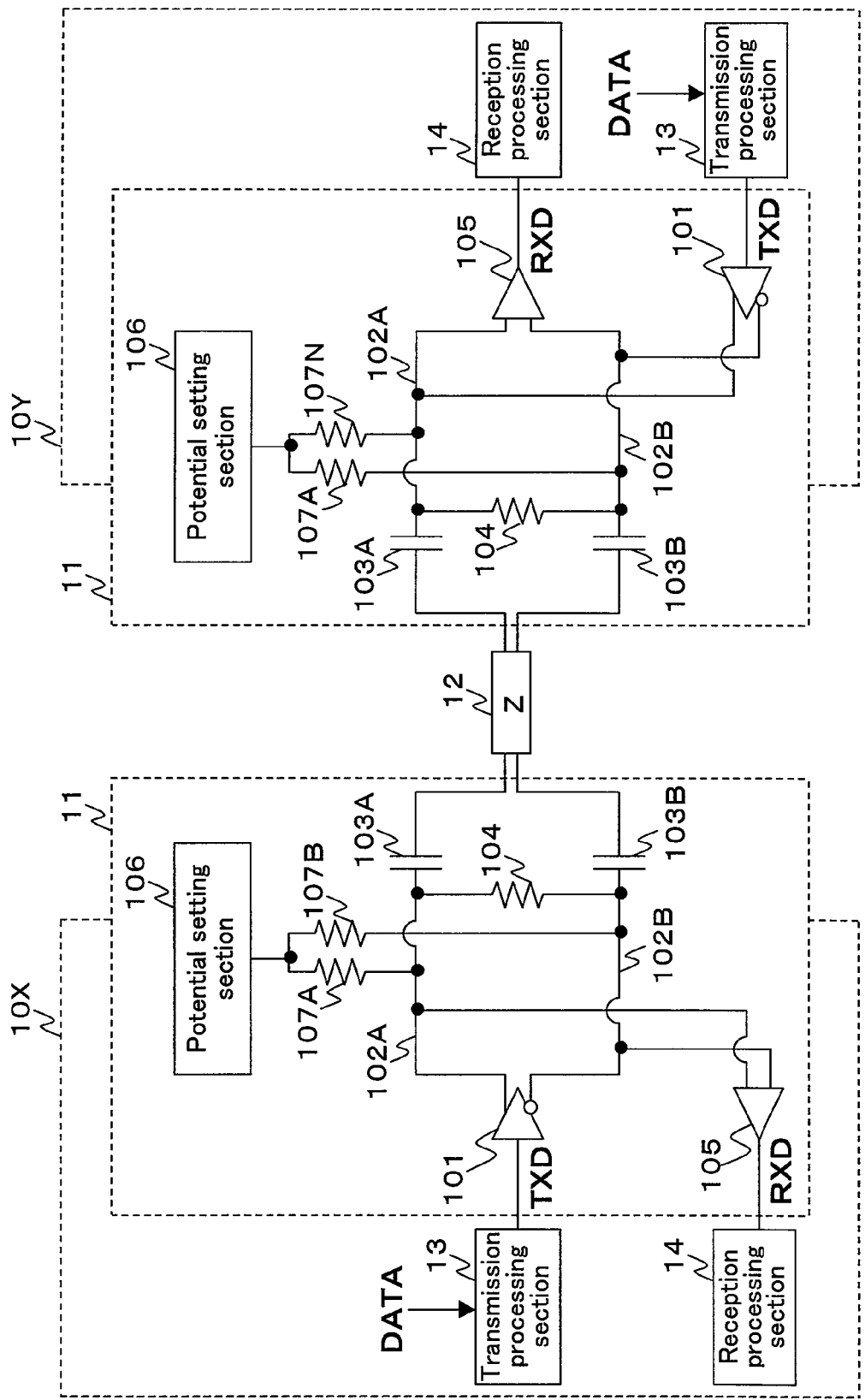
FIG. 1 is a diagram showing a configuration of an interface circuit according to a first embodiment of this invention.

DESCRIPTION OF REFERENCE NUMERALS 10X, 10Y Semiconductor integrated circuit apparatus
11 Interface circuit
12 Differential cable
13 Transmission processing section
14 Reception processing section
15 Timing control section
101 Differential driver
102A, 102B Signal line
103A, 103B Capacitor element
104 Resistor element
105 Differential receiver
106 Potential setting section
107A, 107B, 108A, 108B Resistor element
201 Feedback control section
301 Bias detection section
401 Squelch determination section
111 Current supply section
112 Differential output section
113, 123 Driving adjustment section
131 Preemphasis section
501 Reference current source
502, 503 NMOS transistor
504 Capacitor element
505 PMOS transistor
511A, 511B, 512A, 512B Current source
513 Splitter section
601 Reference current source
602, 603, 604, 605 NMOS transistor
606 PMOS transistor
711A, 711B, 712A, 712B Current source

BEST MODE FOR CARRYING OUT THE INVENTION

Embodiments of this invention will now be described with reference to the drawings. Note that like elements will be denoted by like reference numerals, and will not be described repeatedly.

First Embodiment

<General Configuration>

FIG. 1 shows a configuration of an interface circuit according to a first embodiment of this invention. Interface circuits 11 and 11 are mounted respectively on semiconductor integrated circuit apparatuses 10X and 10Y, and are connected to opposite ends of a differential cable 12 (e.g., twisted cable). Each of the semiconductor integrated circuit apparatuses 10X and 10Y performs a bidirectional data transfer via the differential cable 12, and includes a transmission processing section 13 and a reception processing section 14 mounted thereon, other than the interface circuit 11. The transmission processing section 13 is, for example, a parallel-serial conversion circuit for converting parallel data DATA to serial data, and outputting the serial data as the transmit data TXD.

<Configuration of Interface Circuit>

The interface circuit 11 includes a differential driver 101, a pair of signal lines (102A and 102B), a pair of capacitors (103A and 103B), a resistor element 104, a differential receiver 105, and a potential setting section 106. The interface circuit 11 performs an operation (precharge operation) of setting the potential of the pair of signal lines (102A and 102B) to a predetermined stable potential before the differential signal is transferred to the pair of signal lines (102A and 102B) in a data transmission operation and in a data reception operation, and performs an operation (amplitude control operation) of gradually changing the amplitude of the differential signal when starting, and when finishing, a data transmission operation. The stable potential is a potential for stabilizing the potential of the pair of signal lines (102A and 102B), and is, for example, an intermediate potential (common mode potential) of the differential signal transferred to the pair of signal lines (102A and 102B).

In a data transmission operation, the differential driver 101 converts the transmit data TXD (digital data) from the transmission processing section 13 to a differential signal and outputs the differential signal. The differential driver 101 starts the output of the differential signal so that the amplitude of the differential signal gradually increases when starting a data transmission operation, and stops the output of the differential signal so that the amplitude of the differential signal gradually decreases when finishing a data transmission operation. The pair of signal lines (102A and 102B) connect a pair of output terminals of the differential driver 101 with the pair of capacitors (103A and 103B), and transfer a differential signal. The pair of capacitors (103A and 103B) are for AC-coupling the pair of signal lines (102A and 102B) with the differential cable 12, and relay a differential signal between the pair of signal lines (102A and 102B) and the differential cable 12. The resistor element 104 connects the signal lines 102A and 102B with each other. A pair of input terminals of the differential receiver 105 are connected to the pair of signal lines (102A and 102B), and receive a differential signal transferred to the pair of signal lines (102A and 102B) in a data reception operation. The differential receiver 105 converts the received differential signal to the receive data RXD (digital data), and outputs the receive data RXD to the reception processing section 14.

The potential setting section 106 is connected to the pair of signal lines (102A and 102B) via a pair of resistors (107A and 107B), and supplies a charge so that the potential of the pair of signal lines (102A and 102B) becomes equal to a stable potential before the differential signal is transferred to the pair of signal lines (102A and 102B), in a data transmission operation and in a data reception operation.

The transmit data TXD representing a dummy pattern is given to the differential driver 101 after the start of the output of the differential signal until the amplitude of the differential signal becomes equal to a predetermined prescribed amplitude value (e.g., an amplitude value prescribed in a data transfer standard). On the other hand, valid data representing information to be transmitted is given to the differential driver 101 as the transmit data TXD, after the amplitude of the differential signal becomes equal to the prescribed amplitude value.

Figure 2:
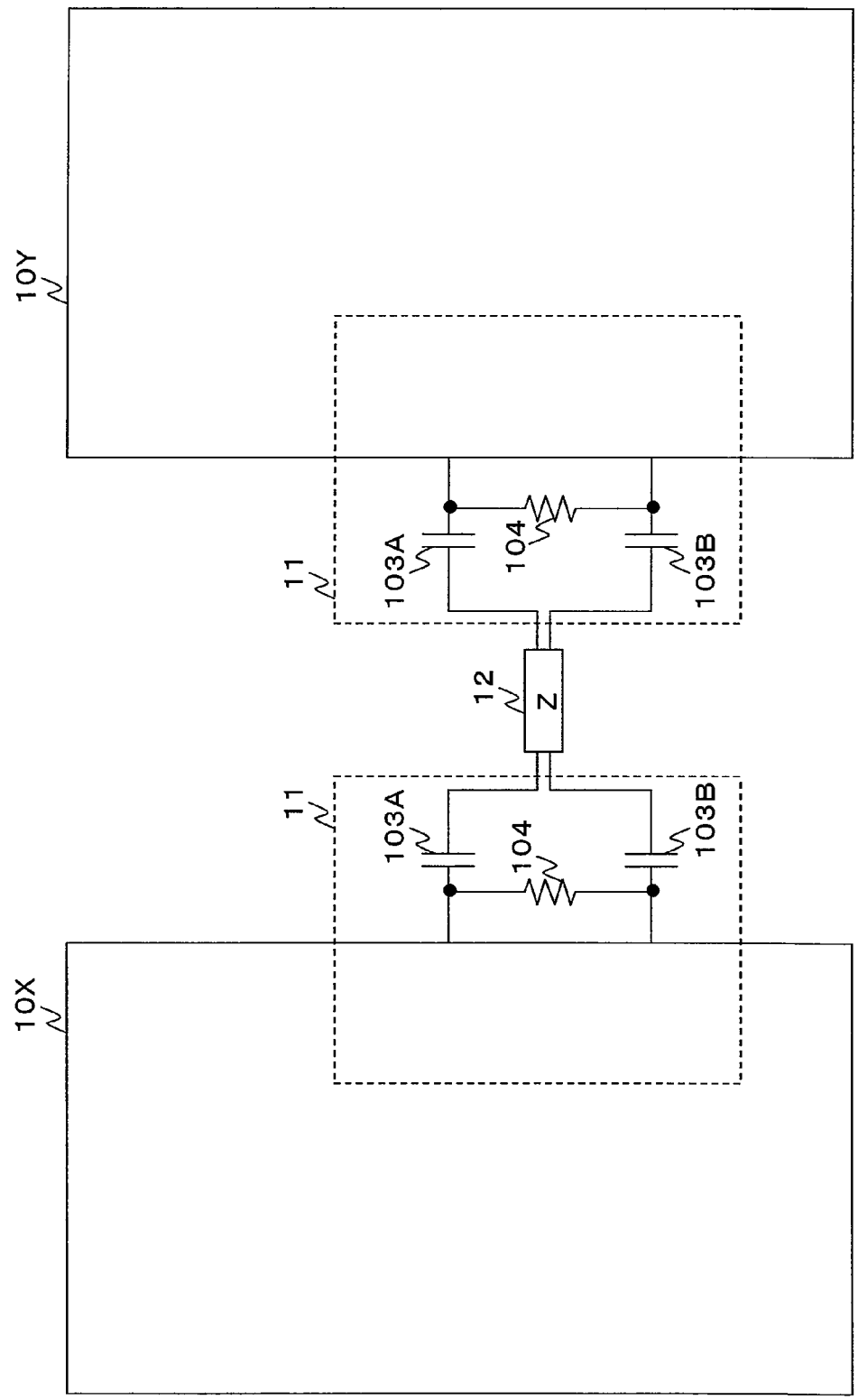
FIG. 2 is an external view of the semiconductor integrated circuit apparatus shown in FIG. 1.

Note that as shown in FIG. 2, the pair of capacitors (103A and 103B) and the resistor element 104 of the interface circuit 11 are placed outside the semiconductor integrated circuit apparatuses 10X and 10Y.

<Operation when Transmitting Data>

Figure 3:
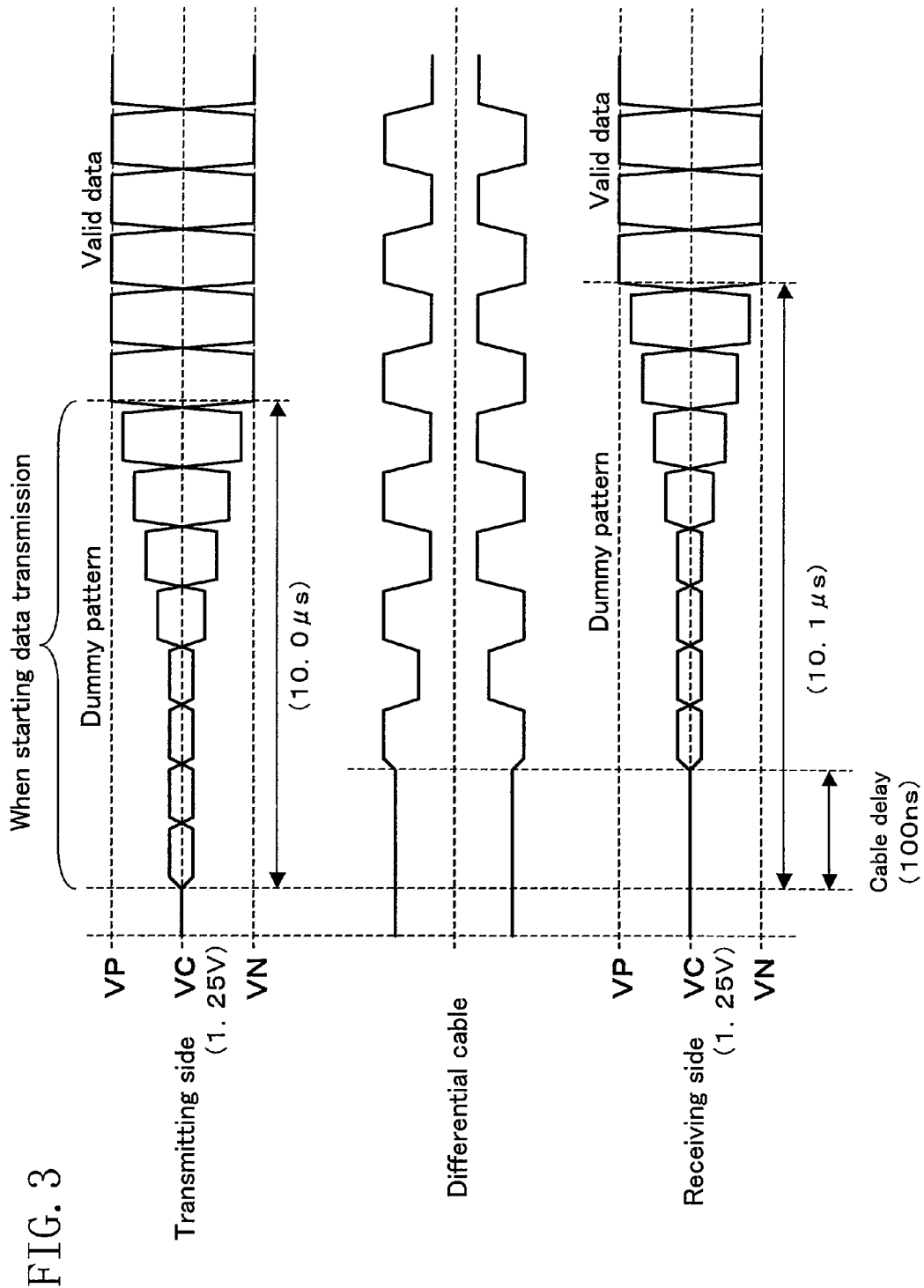
FIG. 3 is a waveform diagram showing signal amplitudes on the transmitting side, the differential cable and the receiving side, when starting a data transmission operation.

Next, referring to FIGS. 3 and 4, an operation performed by the interface circuit 11 shown in FIG. 1 in a data transmission operation will be described. In a data transmission operation, the interface circuit 11 receives the transmit data TXD from the transmission processing section 13, and converts the transmit data TXD to a differential signal, which is transferred to the differential cable 12. Note that the stable potential is herein assumed to be a common mode potential (VC).

[During Preparation for Data Transmission]

In a data transmission operation, the potential setting section 106 becomes active and starts supplying a charge to the pair of signal lines (102A and 102B). This charges/discharges the pair of capacitors (103A and 103B), and the potential of the pair of signal lines (102A and 102B) becomes equal to the common mode potential (VC), as shown in FIG. 3. Then, the potential setting section 106 becomes inactive, and stops supplying the charge.

[When Starting Data Transmission]

Then, the transmission processing section 13 starts outputting the transmit data TXD representing a dummy pattern. The differential driver 101 converts the transmit data TXD from the transmission processing section 13 to a differential signal while gradually increasing the amplitude of the differential signal. Thus, as shown in FIG. 3, the signal amplitude of the pair of signal lines (102A and 102B) gradually increases from the common mode potential (VC) to become equal to the prescribed amplitude value (VP-VN). On the other hand, since the pair of signal lines (102A and 102B) and the differential cable 12 are AC-coupled with each other, an AC pulse passes through the differential cable 12, as shown in FIG. 3.

Then, the transmission processing section 13 stops outputting the transmit data TXD representing a dummy pattern, and starts outputting the transmit data TXD representing valid data. The transmit data TXD representing valid data is converted to a differential signal by the differential driver 101, and then transferred to the receiving side via the differential cable 12.

[When Finishing Data Transmission]

Then, when the output of the transmit data TXD representing valid data is complete, the transmission processing section 13 stops outputting the transmit data TXD. On the other hand, the differential driver 101 gradually decreases the amplitude of the differential signal. Thus, as shown in FIG. 4, the signal amplitude of the pair of signal lines (102A and 102B) gradually decreases from the prescribed amplitude value (VP-VN) to become equal to the common mode potential (VC). On the other hand, as shown in FIG. 4, an AC pulse passes through the differential cable 12, as does when starting a data transmission operation.

<Operation when Receiving Data>

Next, referring to FIGS. 3 and 4, an operation performed by the interface circuit 11 shown in FIG. 1 in a data reception operation will be described. In a data reception operation, the interface circuit 11 receives the differential signal transferred from the transmitting side via the differential cable 12, and converts the differential signal to the receive data RXD, which is transferred to the reception processing section 14.

[During Preparation for Data Reception]

In a data reception operation, the potential setting section 106 performs a similar operation to that in a data transmission operation so that the potential of the pair of signal lines (102A and 102B) becomes equal to the common mode potential (VC).

[When Starting Data Reception]

Then, the differential signal corresponding to a dummy pattern is transferred from the transmitting side via the differential cable 12. The potential of the pair of signal lines (102A and 102B) on the receiving side is also equal to the common mode potential (VC), as is the case on the transmitting side, and therefore the signal amplitude of the pair of signal lines (102A and 102B) becomes equal to the signal amplitude on the transmitting side with a delay due to the differential cable 12, as shown in FIG. 3.

Then, the differential signal corresponding to valid data is transferred from the transmitting side via the differential cable 12. The differential receiver 105 converts the differential signal transferred to the pair of signal lines (102A and 102B) to the receive data RXD. Thus, the reception processing section 14 receives the receive data RXD representing valid data.

[When Finishing Data Reception]

Figure 4:
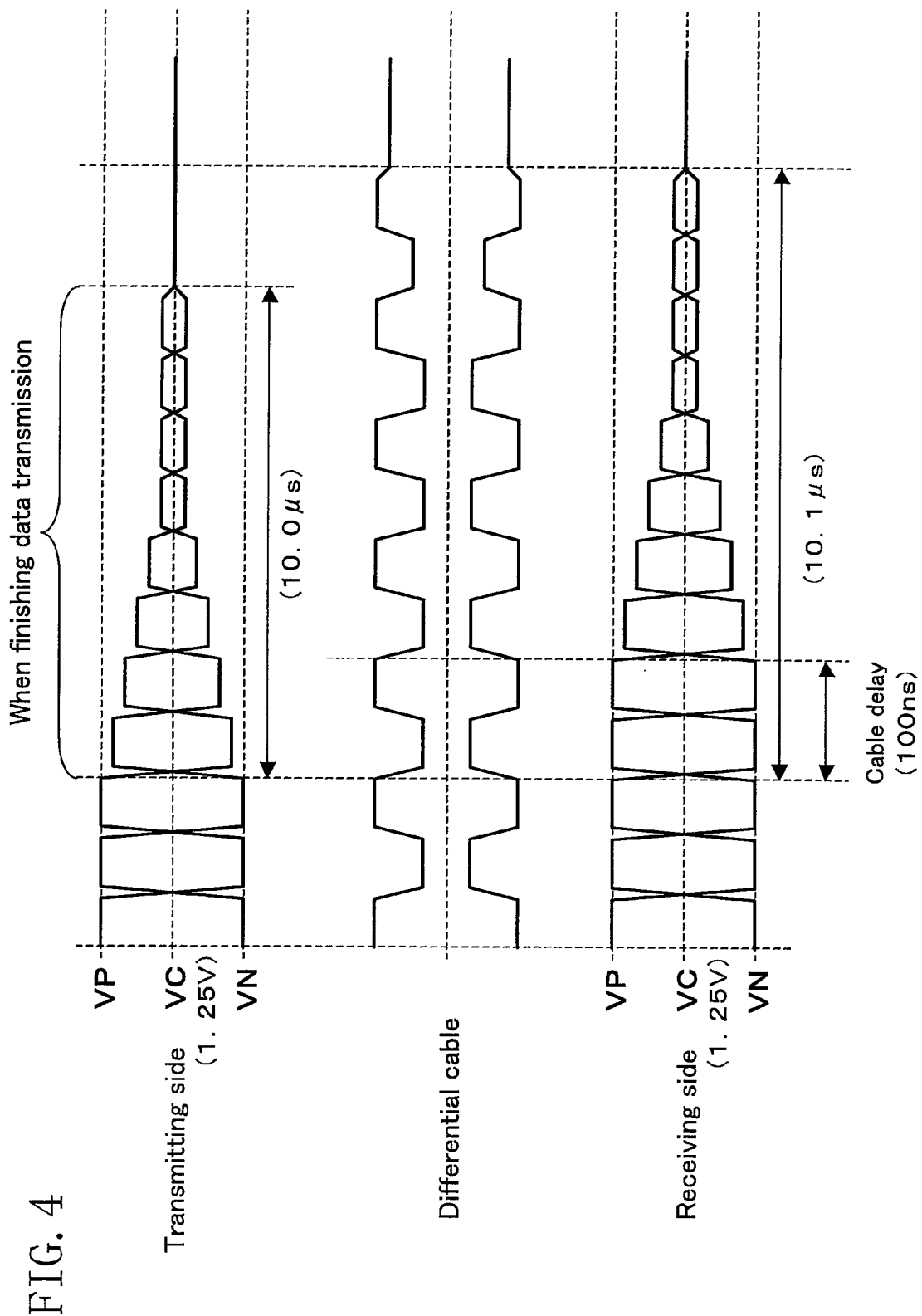
FIG. 4 is a waveform diagram showing signal amplitudes on the transmitting side, the differential cable and the receiving side, when finishing a data transmission operation.

When the transmission of valid data is complete, the signal amplitude of the pair of signal lines (102A and 102B) gradually decreases from the prescribed amplitude value (VP-VN) to become equal to the common mode potential (VC), as does the signal amplitude on the transmitting side, as shown in FIG. 4.

<Signal Amplitude Comparison>

Next, a case where a precharge operation is performed and a case where a precharge operation is not performed will be compared with each other. Note that it is assumed herein that the common mode potential (VC) is "1.25 V", and the parameters of the various elements are as follows.

Capacitance value of capacitor elements 103A and 103B: 1 µF

Resistance value of resistor element 104: 100Ω

Figure 5:
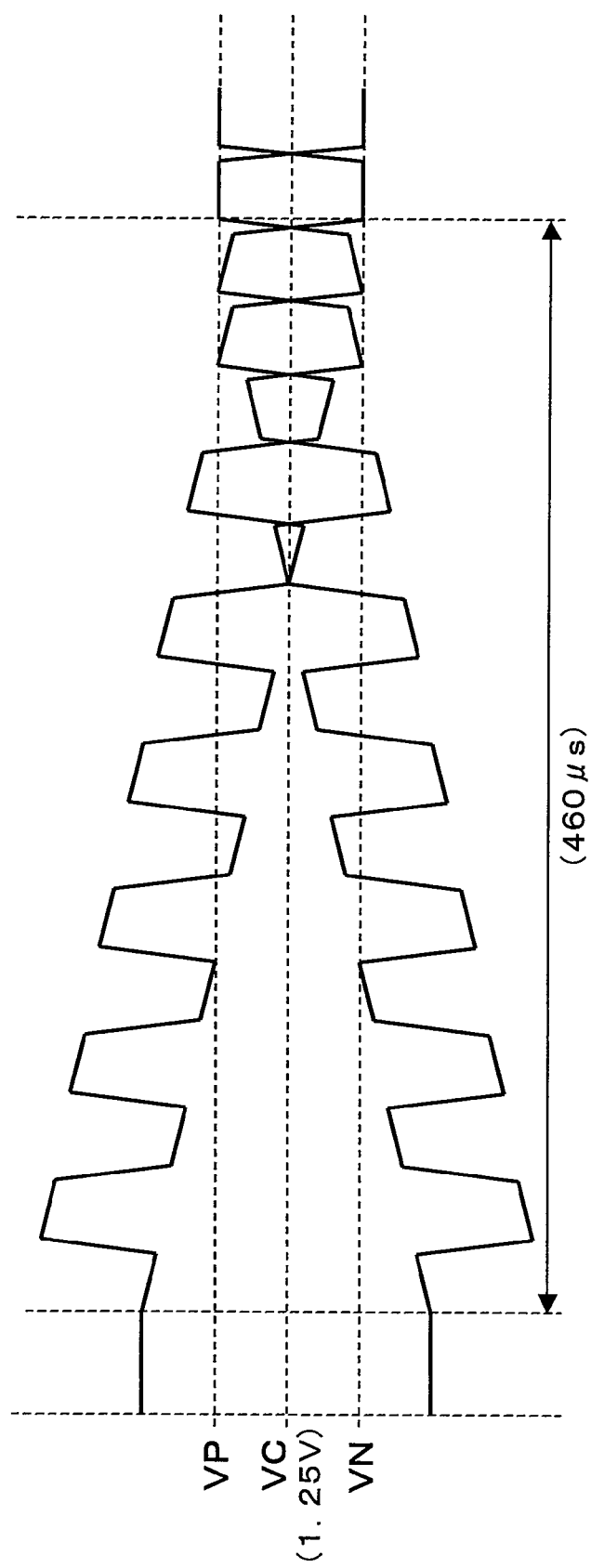
FIG. 5 is a waveform diagram showing a signal amplitude where a precharge operation is not performed.

Resistance value of resistor elements 107A and 107B: 10 kΩ

Where a precharge operation is not performed, the potentials of the signal lines 102A and 102B may exhibit different potentials from each other, as shown in FIG. 5. In such a case, it takes "about 460 µs" since the start of the output of the differential signal until the potentials of the signal lines 102A and 102B cross each other and the amplitude of the differential signal becomes stable at the prescribed amplitude value.

On the other hand, where a precharge operation is performed (i.e., in the case of the present embodiment), the amount of time (stabilization time) required before the amplitude of the differential signal becomes equal to the prescribed amplitude value after the start of the output of the differential signal is "about 10 µs", and is shorter than that where a precharge operation is not performed.

<Effects>

As described above, by the AC-coupling between the pair of signal lines and the differential cable, it is possible to ensure a resistance to LSI breakdown due to ESD (Electro-Static Discharge). Moreover, it is possible to shorten the stabilization time by the precharge operation.

By gradually increasing the amplitude of the differential signal when starting a data transmission operation, it is possible to prevent the potential of the pair of signal lines from fluctuating rapidly, and it is possible to further shorten the stabilization time. Moreover, by gradually decreasing the amplitude of the differential signal when finishing a data transmission operation, the potential of the pair of signal lines can be brought back to the stable potential, and it is therefore possible to start the output of the differential signal without performing the precharge operation in the next data transmission operation. Note that even where only the precharge operation is performed without performing an amplitude control operation, it is possible to shorten the stabilization time from that of the prior art.

Preferred examples of a dummy pattern are shown in (1) to (3) below.

(1) A bit string in which "0"s and "1"s alternate with each other.

(2) A bit string in which the probability of occurrence of "0" is equal to that of "1" for a predetermined unit number of bits. A DC-balanced bit string.

(3) A bit string representing a sync pattern.

Where the semiconductor integrated circuit has a function of switching the rates at which the transmit data TXD is transferred (e.g., where the output rate of the transmission processing section 13 is variable), the transfer rate for the dummy pattern can be made higher than that for valid data. Then, it is possible to further shorten the stabilization time.

(Variation)

Figure 6:
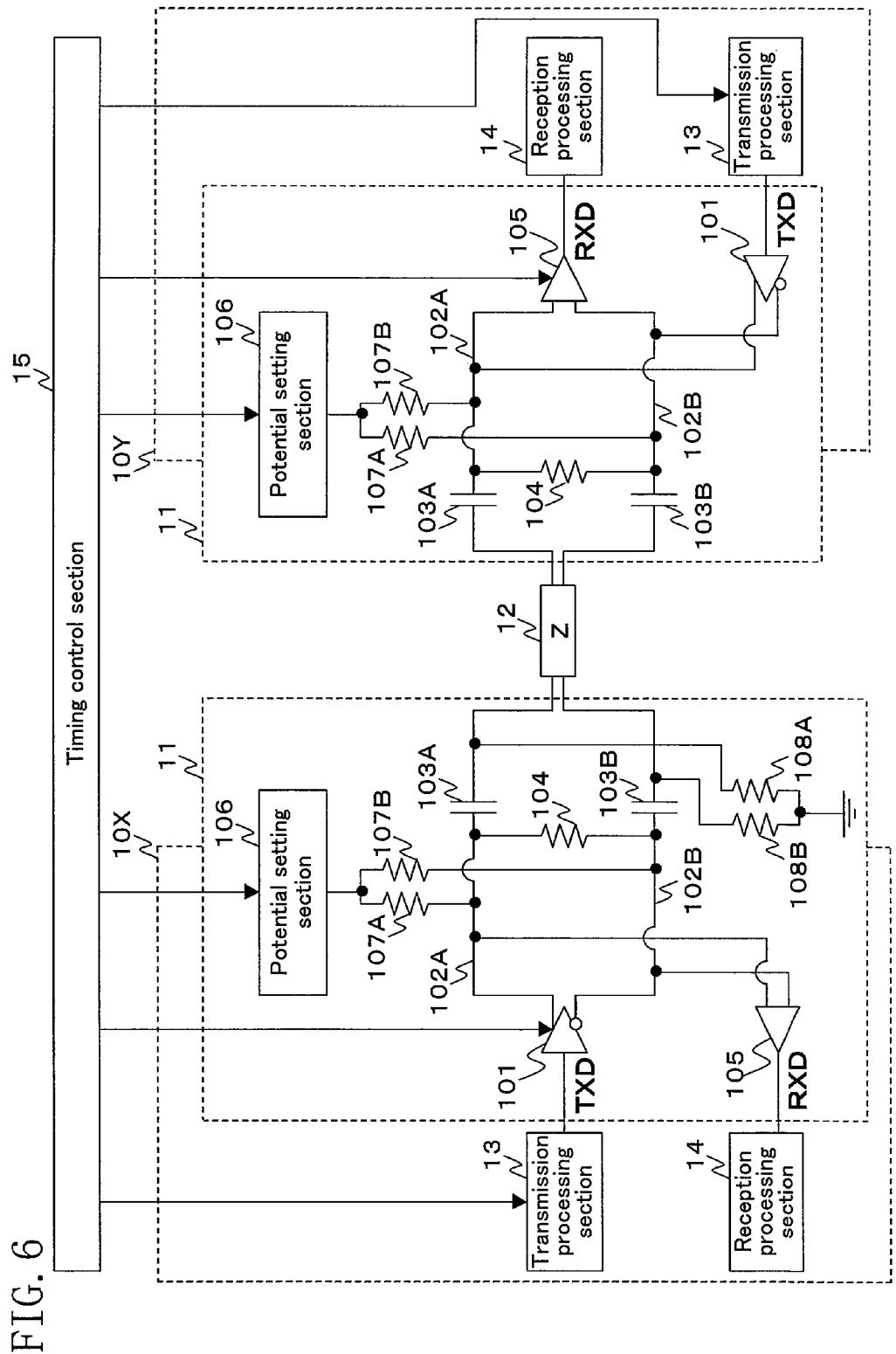
FIG. 6 is a diagram showing a variation of the interface circuit shown in FIG. 1.

As shown in FIG. 6, the data transmitting/receiving system may be provided with a timing control section 15, in addition to the semiconductor integrated circuit apparatuses 10X and 10Y, for controlling the timing for driving the interface circuit 11 and the transmission processing section 13. With such a configuration, the precharge operation, and the like, can be performed with appropriate timing. For example, a configuration may be employed in which the amount of time (precharge time) required before the potential of the pair of signal lines (102A and 102B) becomes equal to the stable potential is measured in advance so that the timing control section 15 activates the potential setting section 106, and after the passage of the precharge time, the timing control section 15 inactivates the potential setting section 106 and activates the transmission processing section 13 and the differential driver 101.

Figure 7:
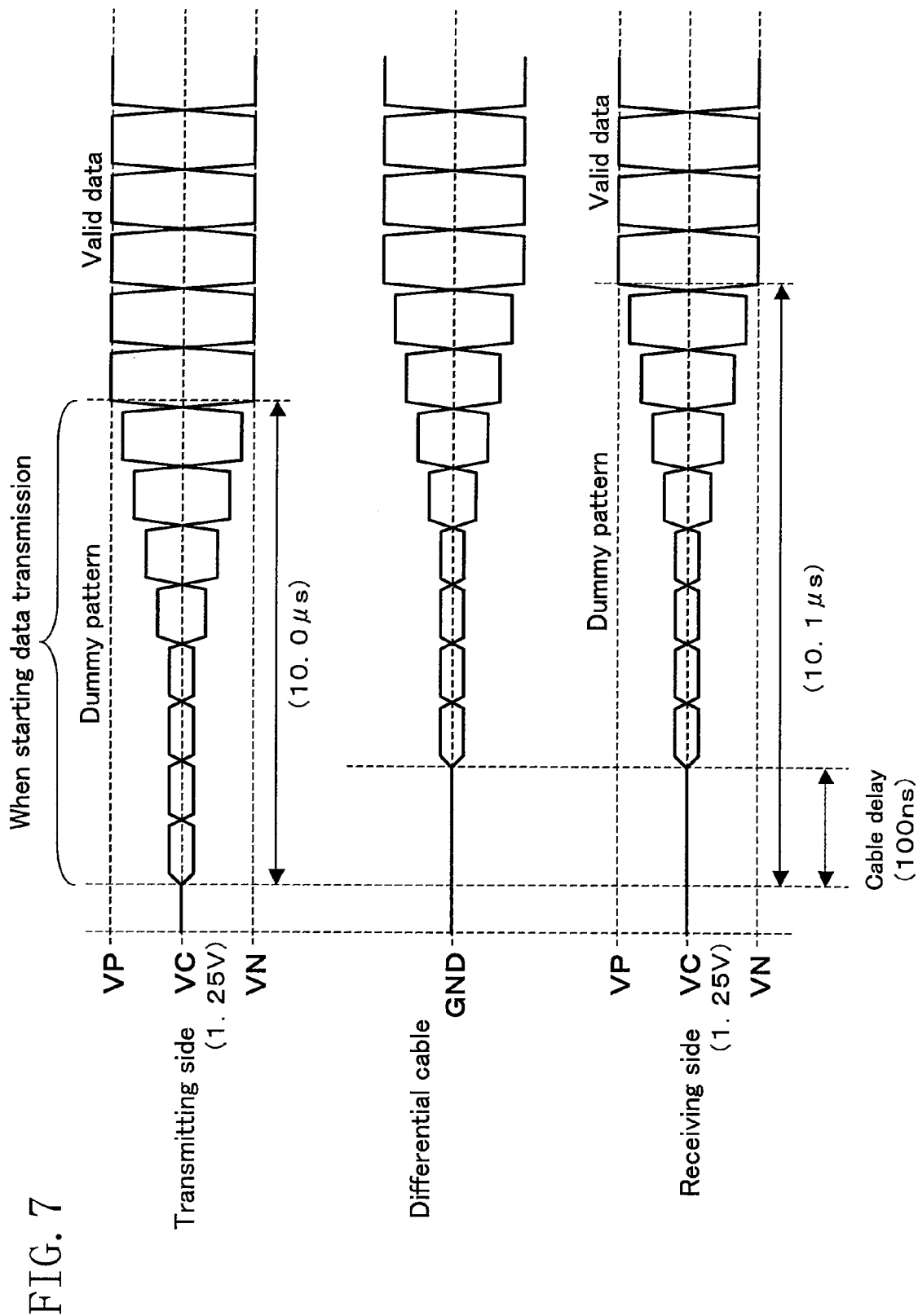
FIG. 7 is a waveform diagram showing signal amplitudes on the transmitting side, the differential cable and the receiving side, when starting a data transmission operation.
Figure 8:
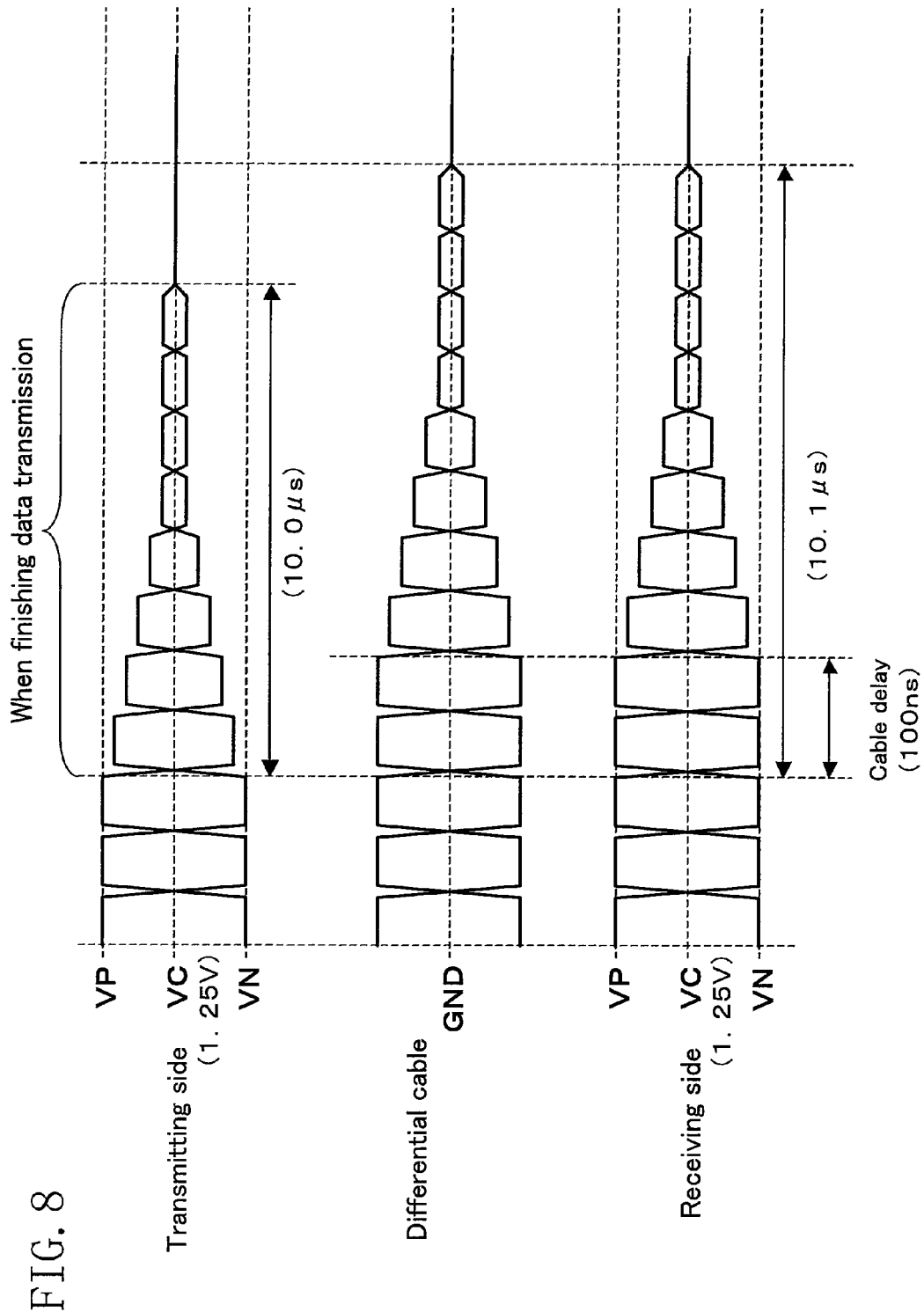
FIG. 8 is a waveform diagram showing signal amplitudes on the transmitting side, the differential cable and the receiving side, when finishing a data transmission operation.

The differential cable 12 may be electrically connected to a fixed potential (e.g., the ground potential) via a pair of resistors (108A and 108B). The resistance value of the pair of resistors (108A and 108B) is preferably larger than the resistance value of the resistor element 104 (e.g., 10 kΩ). With such a configuration, the signal amplitude of the differential cable 12 has a similar signal waveform to that on the transmitting side, with the ground potential GND being the stable potential, as shown in FIGS. 7 and 8. Thus, it is possible to stabilize the amount of charge on the differential cable, and it is possible to absorb noise generated along the differential cable, thereby establishing a stable communications system.

Second Embodiment

<Configuration>

Figure 9:
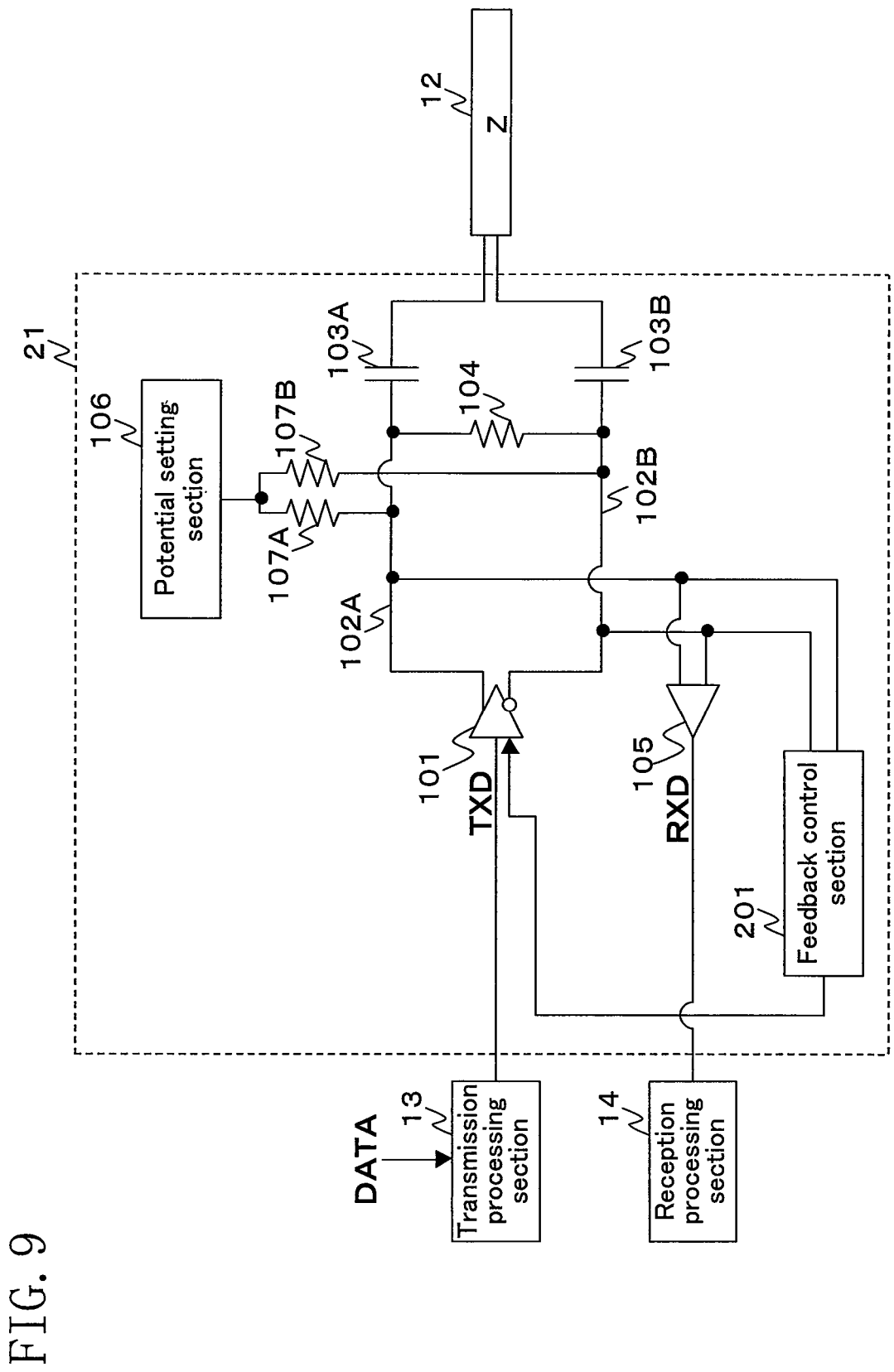
FIG. 9 is a diagram showing a configuration of an interface circuit according to a second embodiment of this invention.

FIG. 9 shows a configuration of an interface circuit according to a second embodiment of this invention. An interface circuit 21 further includes a feedback control section 201, in addition to the interface circuit 11 shown in FIG. 1. Otherwise, the configuration is similar to that of FIG. 1. When starting a data transfer, the interface circuit 21 performs an operation (feedback control operation) of controlling the amplitude of the differential signal according to the amplitude of the differential signal of the pair of signal lines (102A and 102B).

When starting a data transmission operation, the feedback control section 201 detects the amplitude of the differential signal of the pair of signal lines (102A and 102B), and compares the detected amplitude of the differential signal with a predetermined reference amplitude value to adjust the amount of output current from the differential driver 101 based on the comparison result. The reference amplitude value is, for example, an arbitrary amplitude value that is smaller than the prescribed amplitude value.

<Operation>

Figure 10:
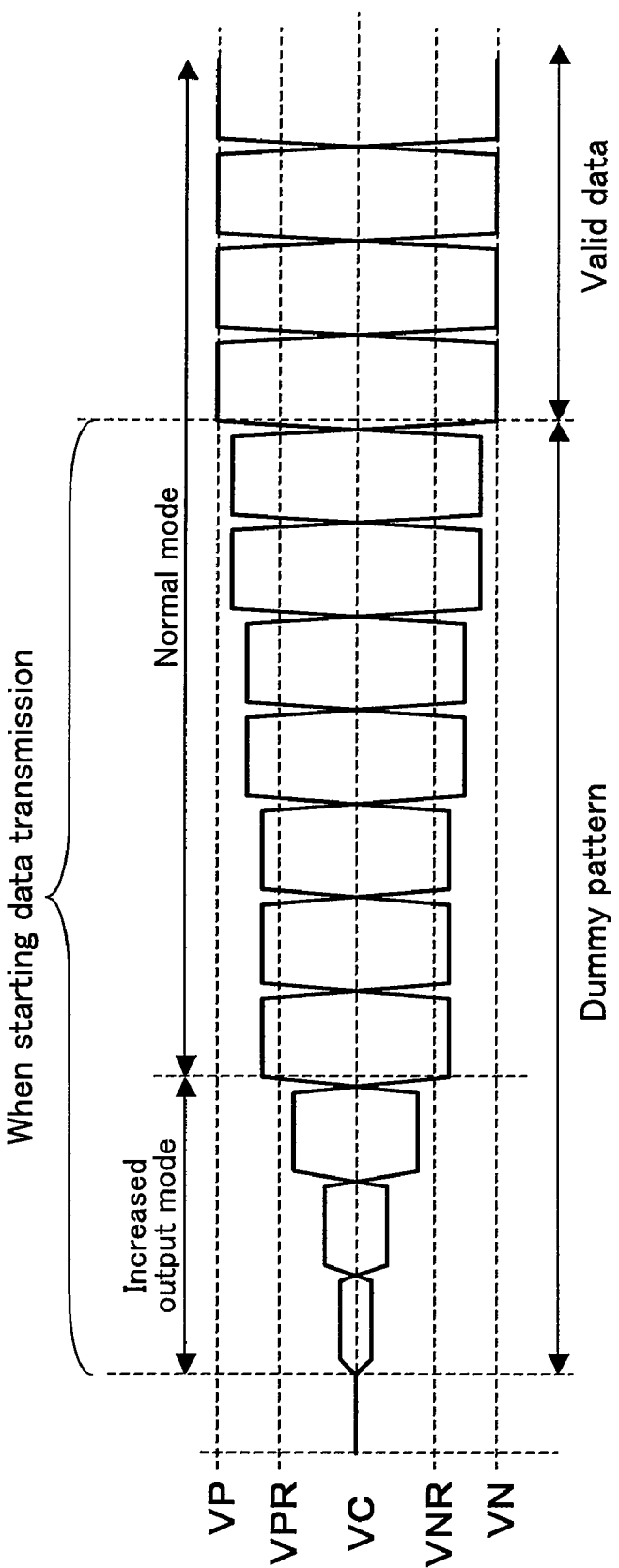
FIG. 10 is a waveform diagram illustrating a feedback control operation by the interface circuit shown in FIG. 9.

Next, referring to FIG. 10, a feedback operation performed by the interface circuit shown in FIG. 9 will be described.

First, as in the first embodiment, in a data transmission operation, a precharge operation is performed, after which the differential driver 101 receives the transmit data TXD representing dummy data and gradually increases the amplitude of the differential signal. On the other hand, the feedback control section 201 detects the amplitude of the differential signal of the pair of signal lines (102A and 102B), and compares it with the reference amplitude value (VPR-VNR).

In an initial stage, the feedback control section 201 determines that the amplitude of the differential signal of the pair of signal lines (102A and 102B) is smaller than the reference amplitude value (VPR-VNR), and therefore sets the amount of output current from the differential driver 101 to an amount greater than that in the normal state. That is, the operation mode of the differential driver 101 is set to the "increased output mode" in which the amount of output current is greater than that in the "normal mode". Thus, the amount of charge with which the pair of capacitors (103A and 103B) are charged (or the amount of charge discharged therefrom) is increased, and the amplification rate of the differential signal is greater than that in the normal mode.

On the other hand, if the feedback control section 201 determines that the amplitude of the differential signal of the pair of signal lines (102A and 102B) is greater than or equal to the reference amplitude value (VPR-VNR), the feedback control section 201 brings the amount of output current from the differential driver 101 back to that in the normal state. That is, the operation mode of the differential driver 101 is switched from the "increased output mode" to the "normal mode". Thus, the output current from the differential driver 101 returns to the normal current amount, and therefore the amplification rate of the differential signal returns to that in the normal state.

<Effects>

As described above, by adjusting the amount of output current from the differential driver according to the amplitude value of the differential signal of the pair of signal lines, the amplification rate of the differential signal can be made appropriately high when starting a data transmission operation, and it is thereby possible to further shorten the stabilization time.

Note that the feedback control section 201 shown in FIG. 9 is of course applicable also to the interface circuit shown in FIG. 6.

Third Embodiment

<Configuration>

Figure 11:
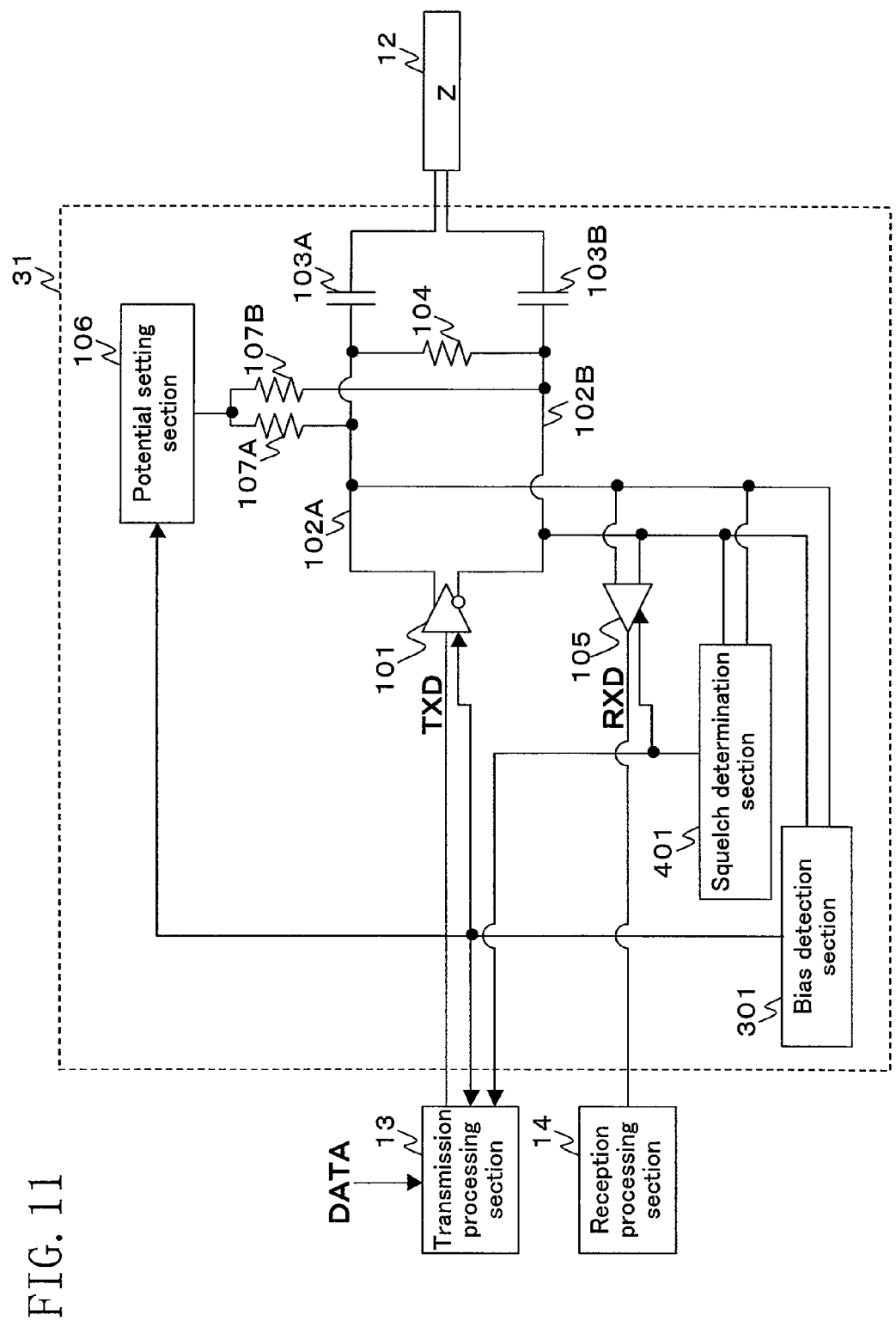
FIG. 11 is a diagram showing a configuration of an interface circuit according to a third embodiment of this invention.

FIG. 11 shows a configuration of an interface circuit according to a third embodiment of this invention. An interface circuit 31 further includes a bias detection section (potential determination section) 301 and a squelch determination section (amplitude determination section) 401, in addition to the interface circuit 11 shown in FIG. 1. The interface circuit 31 performs a potential verification operation in which the output of the differential signal is started after verifying that the potential of the pair of signal lines (102A and 102B) has been brought to an appropriate value by the precharge operation, and an amplitude verification operation in which the transfer of valid data is started (or the reception of the receive data is started) after verifying that the amplitude of the differential signal of the pair of signal lines (102A and 102B) has been brought to an appropriate value.

When the precharge operation is started by the potential setting section 106, the bias detection section 301 detects the potential of the pair of signal lines (102A and 102B) to compare the detected potential with a predetermined reference potential value, and starts the output of the differential signal from the differential driver 101 based on the comparison result. The reference potential value is a reference value used for determining whether the potential of the pair of signal lines (102A and 102B) is stable, and is the common mode potential, for example.

When the differential signal is transferred to the pair of signal lines (102A and 102B), the squelch determination section 401 detects the amplitude of the differential signal of the pair of signal lines (102A and 102B) to compare the detected amplitude of the differential signal with the prescribed amplitude value, and controls the transfer of the transmit data TXD from the transmission processing section 13 to the differential driver 101 (or the operation status of the differential receiver 105) based on the comparison result.

<Potential Verification Operation>

Next, the potential verification operation performed by the interface circuit 31 shown in FIG. 11 will be described.

In a data transmission operation, as the precharge operation is started, the bias detection section 301 detects the potential of the pair of signal lines (102A and 102B) and compares the detected potential with the reference potential value. If the potential of the pair of signal lines (102A and 102B) coincides with the reference potential value, the bias detection section 301 inactivates the potential setting section 106 and instructs the differential driver 101 to start outputting the differential signal (e.g., turns the operation status of the differential driver 101 from "inactive" to "active"). On the other hand, if the potential of the pair of signal lines (102A and 102B) does not coincide with the reference potential value, the bias detection section 301 does not instruct the differential driver 101 to start outputting the differential signal, but continues to detect and determine the potential.

Note that the object to be controlled by the bias detection section 301 may be the transmission processing section 13. In such a case, the bias detection section 301 instructs the transmission processing section 13 to start outputting the transmit data TXD if the potential of the pair of signal lines (102A and 102B) coincides with the reference potential value. Thus, the differential driver 101 starts outputting the differential signal. On the other hand, if the potential of the pair of signal lines (102A and 102B) does not coincide with the reference potential value, the bias detection section 301 does not instruct the transmission processing section 13 to output the transmit data TXD, but continues to detect and determine the potential.

<Amplitude Verification Operation>

Next, the amplitude verification operation performed by the interface circuit 31 shown in FIG. 11 will be described.

[When Transmitting Data]

In a data transmission operation, when the precharge operation is complete, the differential driver 101 starts outputting the differential signal. On the other hand, the squelch determination section 401 detects the amplitude of the differential signal of the pair of signal lines (102A and 102B), and compares the detected amplitude with the prescribed amplitude value. If the amplitude of the differential signal of the pair of signal lines (102A and 102B) is greater than or equal to the prescribed amplitude value, the squelch determination section 401 instructs the transmission processing section 13 to stop outputting a dummy pattern and start outputting the transmit data TXD representing valid data. On the other hand, if the amplitude of the differential signal of the pair of signal lines (102A and 102B) is smaller than the prescribed amplitude value, the squelch determination section 401 does not instruct the transmission processing section 13 to stop outputting the dummy pattern, but continues to detect and determine the amplitude of the differential signal.

[When Receiving Data]

In a data reception operation, when the precharge operation is complete, the squelch determination section 401 detects the amplitude of the differential signal of the pair of signal lines (102A and 102B), and compares the detected amplitude with the prescribed amplitude value. If the amplitude of the differential signal of the pair of signal lines (102A and 102B) is greater than or equal to the prescribed amplitude value, the squelch determination section 401 instructs the differential receiver 105 to start outputting the receive data RXD (i.e., turns the operation status of the differential receiver 105 from "inactive" to "active"). On the other hand, if the amplitude of the differential signal of the pair of signal lines (102A and 102B) is smaller than the prescribed amplitude value, it does not instruct the differential receiver 105 to start outputting the receive data RXD, but continues to detect and determine the amplitude of the differential signal.

<Effects>

As described above, by performing the potential verification operation, the potential of the pair of signal lines can be stabilized reliably. For example, even if the amount of time required for completing the precharge operation fluctuates due to an external factor such as the voltage condition, the temperature condition, the process condition, etc., of the semiconductor integrated circuit apparatus, the potential of the pair of signal lines can be brought to the stable potential reliably. Thus, since it is possible to start outputting the differential signal, with the potential of the pair of signal lines being stable, it is possible to shorten the stabilization time reliably.

In a data transmission operation, by performing the amplitude verification operation, it is possible to transfer valid data, with the amplitude of the differential signal being stable, and the valid data can therefore be received reliably. Moreover, in a data reception operation, by performing the amplitude verification operation, it is possible to perform the conversion to the receive data, with the amplitude of the differential signal being stable, and it is therefore possible to obtain more accurate receive data.

Note that the bias detection section 301 and the squelch determination section 401 shown in FIG. 11 are of course applicable also to the interface circuits shown in FIGS. 6 and 9.

(Configuration of Differential Driver)

Figure 12:
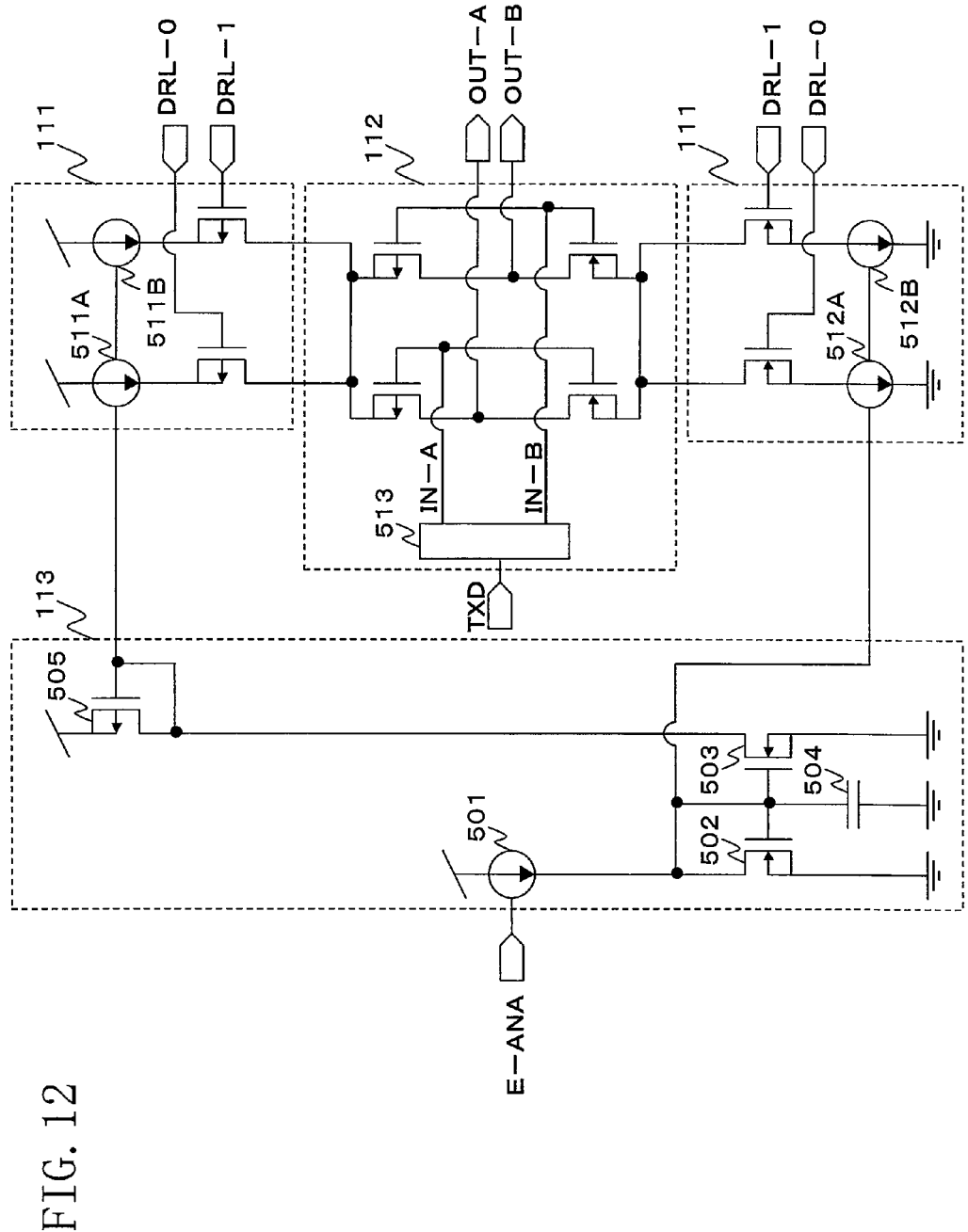
FIG. 12 is a diagram showing Configuration Example 1 of a differential driver.
Figure 13:
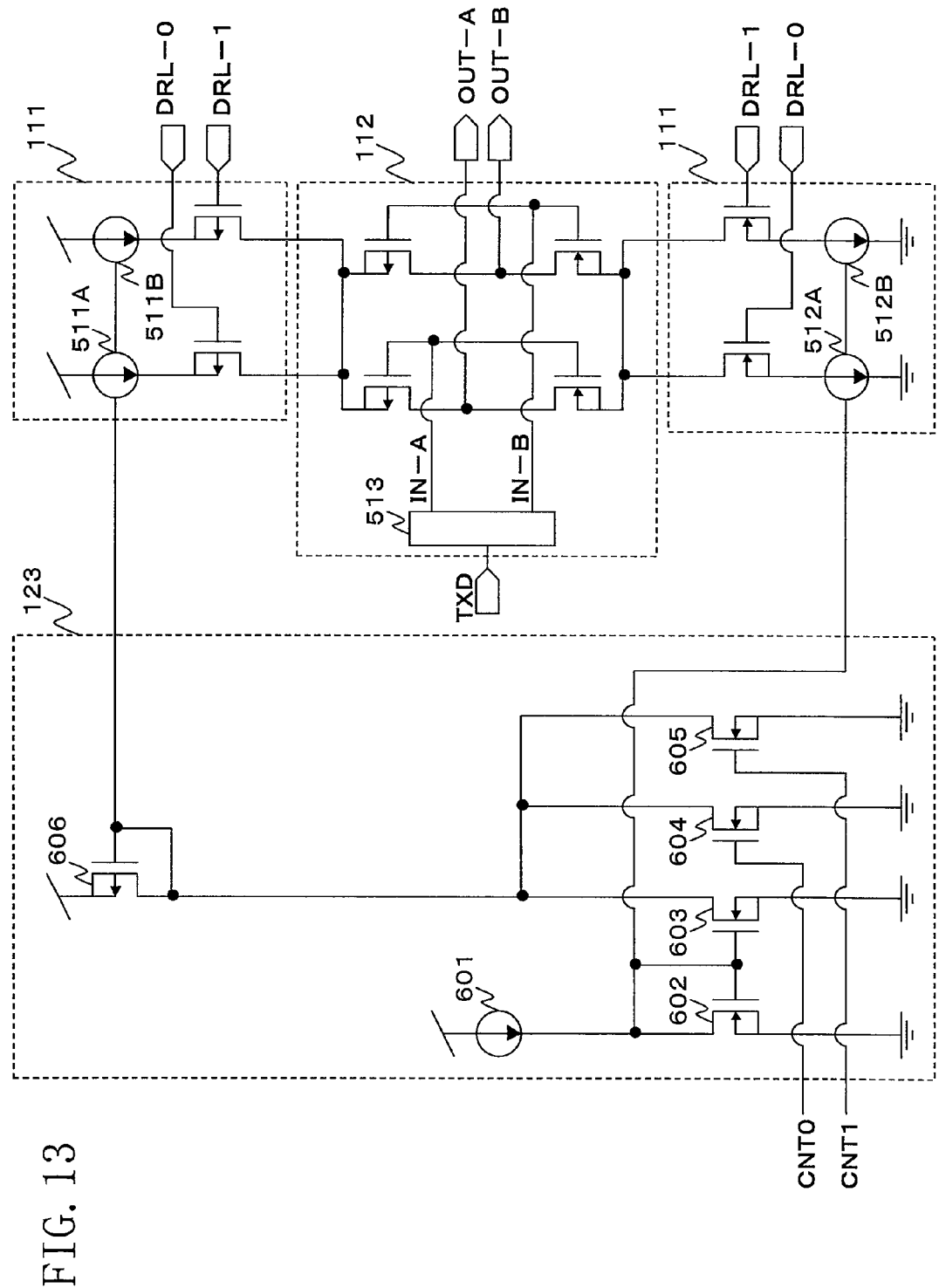
FIG. 13 is a diagram showing Configuration Example 2 of a differential driver.
Figure 14:
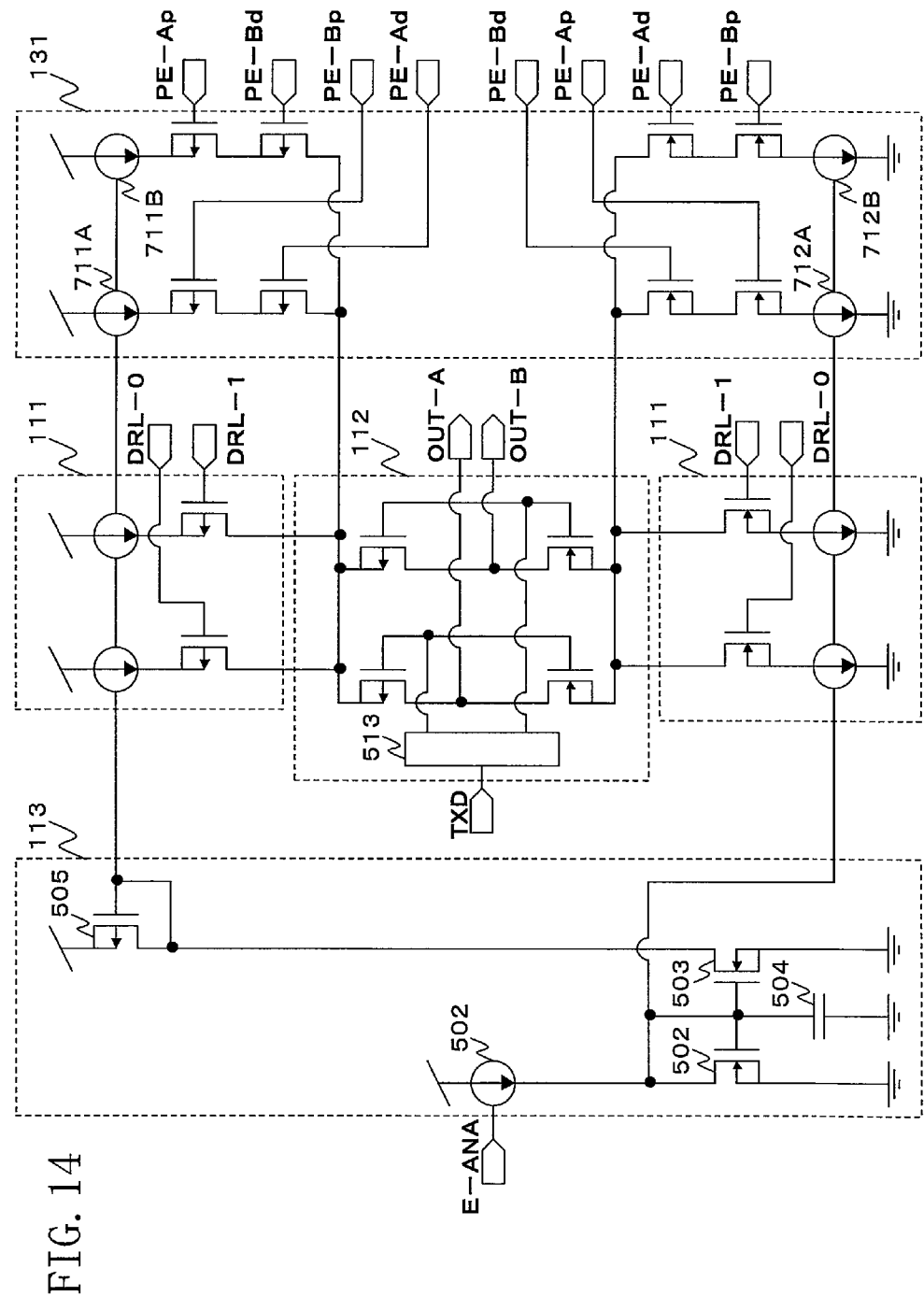
FIG. 14 is a diagram showing Configuration Example 3 of a differential driver.

FIGS. 12 to 14 each show a configuration example of the differential driver 101 used in the various embodiments.

[Configuration Example 1 of Differential Driver]

The operation status of the differential driver shown in FIG. 12 can be switched by the control signal E-ANA. With this differential driver, the current amount of the output current changes gradually when switching the operation status thereof. The differential driver includes a current supply section 111 for supplying the output current, a differential output section 112 for converting the transmit data TXD to a differential signal having an amplitude according to the current amount of the output current supplied from the current supply section 111, and a driving adjustment section 113. The driving adjustment section 113 controls the operation status of the current supply section 111 according to the control signal E-ANA. The driving adjustment section 113 controls the amount of output current of the current supply section 111 so that the amount of output current changes gradually when switching the operation status of the current supply section 111.

In the driving adjustment section 113, a reference current source 501 outputs a reference current when the control signal E-ANA is at the "H level", and stops outputting the reference current when the control signal E-ANA is at the "L level". An NMOS transistor 502 has its gate and drain connected together, and generates a gate potential according to the current amount of the reference current. The gates of the NMOS transistors 502 and 503 are grounded via a capacitor element 504. Therefore, when the output state of the reference current is switched, the gate potential of the NMOS transistors 502 and 503 changes gradually according to a time constant that is dictated by the capacitance value of the capacitor element 504. At this time, the gate potential of a PMOS transistor 505 also changes gradually.

In the current supply section 111, current sources 511A and 511B each supply an output current of a current amount according to the gate potential of the PMOS transistor 505. On the other hand, current sources 512A and 512B each supply an output current of a current amount according to the gate potential of the NMOS transistor 503.

In the differential output section 112, a splitter section 513 switches the potential level of each of positive-negative signals IN-A and IN-B according to the transmit data TXD (digital data). For example, when the transmit data TXD has a bit value of "1", the splitter section 513 brings the positive-negative signal IN-A to the "H level" and the positive-negative signal IN-B to the "L level". Note that the terminals OUT-A and OUT-B are the pair of output terminals of the differential driver.

In order to gradually increase the amplitude of the differential signal when starting a data transmission operation, it can be done by bringing the control signal E-ANA from the "L level" to the "H level". Thus, in the driving adjustment section 113, the gate potential of the NMOS transistor 503 and the gate potential of the PMOS transistor 505 change gradually, thereby gradually increasing the current amount of the output current supplied from the current supply section 111, and it is possible to gradually increase the amplitude of the differential signal.

On the other hand, in order to gradually decrease the amplitude of the differential signal when finishing a data transmission operation, it can be done by bringing the control signal E-ANA from the "H level" to the "L level". Thus, the current amount of the output current supplied from the current supply section 111 gradually decreases, and it is possible to gradually decrease the amplitude of the differential signal.

[Configuration Example 2 of Differential Driver]

With the differential driver shown in FIG. 13, the current amount of the output current can be adjusted by the control signals CNT0 and CNT1. The differential driver includes a driving adjustment section 123, instead of the driving adjustment section 113 shown in FIG. 12. Otherwise, the configuration is similar to that of FIG. 12. The driving adjustment section 123 controls the current amount of the output current supplied from the current supply section 111 according to the control signals CNT0 and CNT1.

In the driving adjustment section 123, a reference current source 601 outputs a reference current. An NMOS transistor 602 has its gate and drain connected together, and generates a gate potential according to the reference current. A drain current is generated in an NMOS transistor 603 according to the gate potential, and drain currents are generated in NMOS transistors 604 and 605 according to the voltage levels of the control signals CNT0 and CNT1, respectively. A gate potential is generated at the gate of a PMOS transistor 606 according to the drain currents generated in the NMOS transistors 603, 604 and 605.

The current sources 511A and 511B each supply an output current of a current amount according to the gate potential of the PMOS transistor 606, and the current sources 512A and 512B each supply an output current of a current amount according to the gate potential of the NMOS transistor 602.

In order to gradually increase the amplitude of the differential signal when starting a data transmission operation, it can be done by bringing the control signals CNT0 and CNT1, one after another, from the "L level" to the "H level". Thus, the number of NMOS transistors, among the NMOS transistors 604 and 605, that generate a drain current increases one by one, thereby gradually changing the gate potential of the PMOS transistor 606 and gradually increasing the current amount of the output current supplied from the current supply section 111, thus gradually increasing the amplitude of the differential signal.

On the other hand, in order to gradually decrease the amplitude of the differential signal when finishing a data transmission operation, it can be done by bringing the control signals CNT0 and CNT1, one after another, from the "H level" to the "L level". Thus, the current amount of the output current supplied from the current supply section 111 gradually decreases, thereby gradually decreasing the amplitude of the differential signal.

Note that the number of NMOS transistors (adjustment transistors) whose operation status is switched by receiving a control signal may be three or more.

[Configuration Example 3 of Differential Driver]

The differential driver shown in FIG. 14 has a preemphasis function of emphasizing the amplitude of a high-frequency component, of the amplitude of the differential signal, according to the control signals PE-Ap, PE-Bd, PE-Bp and PE-Ad. The control signals PE-Ap, PE-Bd, PE-Bp and PE-Ad are controlled by the transmission processing section 13, for example.

The differential driver further includes a preemphasis section 131, in addition to the configuration shown in FIG. 12. When the transmit data TXD given to the differential output section 112 is a "transitional bit", the preemphasis section 131 supplies an emphasis current to the differential output section 112 for a short period of time (e.g., about 10% of the data width of the transmit data TXD) including therein the transition period of the bit, and when the transmit data TXD is a "non-transitional bit", the preemphasis section 131 stops outputting the emphasis current. A transitional bit is a bit value whose sign is different from that of the preceding bit value, and a non-transitional bit is a bit value whose sign is the same as that of the preceding bit value. For example, where the transmit data TXD transitions from "0" to "1", the "1" is a transitional bit with respect to the "0".

When the transmit data TXD given to the differential output section 112 is a "transitional bit", the control signals PE-Ap, PE-Bd, PE-Bp and PE-Ad are controlled according to the change of the bit value so that emphasis currents are supplied from current sources 711A, 711B, 712A and 712B, and the emphasis currents from the current sources 711A, 711B, 712A and 712B are supplied to the differential output section 112. On the other hand, when the transmit data TXD given to the differential output section 112 is a "non-transitional bit", the control signals PE-Ap, PE-Bd, PE-Bp and PE-Ad are controlled so that emphasis currents are not supplied from the current sources 711A, 711B, 712A and 712B.

Figure 15:
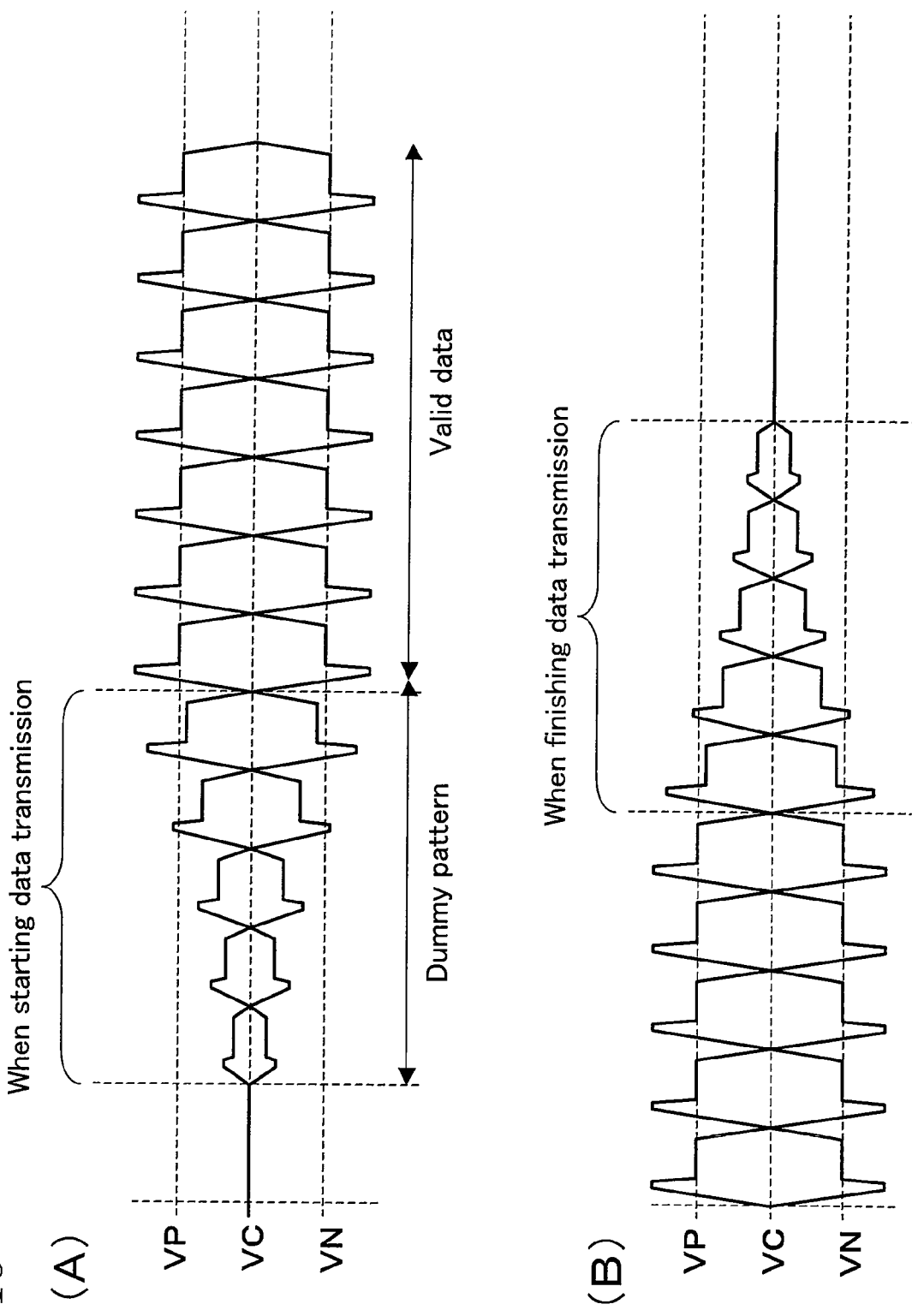
FIG. 15 is a waveform diagram illustrating a differential signal output from the differential driver shown in FIG. 14.

With the preemphasis function, the amplitude of the differential signal gradually increases when starting a data transmission operation as shown in FIG. 15A, and the amplitude of the differential signal gradually decreases when finishing a data transmission operation as shown in FIG. 15B. With such a configuration, the amplification rate of the differential signal can be increased when starting, and when finishing, a data transmission operation, and it is possible to further shorten the stabilization time. As the switching of the differential signal is emphasized, it is possible to suppress the attenuation of the high-frequency component of the differential signal along the differential cable.

[Switching the Amount of Output Current]

In each of the above differential drivers shown in FIGS. 12 to 14, it is possible to switch the amount of output current of the differential driver from one to another by selectively using the current sources 511A and 511B based on the control signals DRL-0 and DRL-1. For example, by setting the amount of output current of the current source 511A to the "current amount in the normal mode" and setting the amount of output current of the current source 512B to the "current amount in the increased output mode", which is greater than the current amount in the normal mode, it can be used as the differential driver 101 of the second embodiment (FIG. 9).

Figure 16:
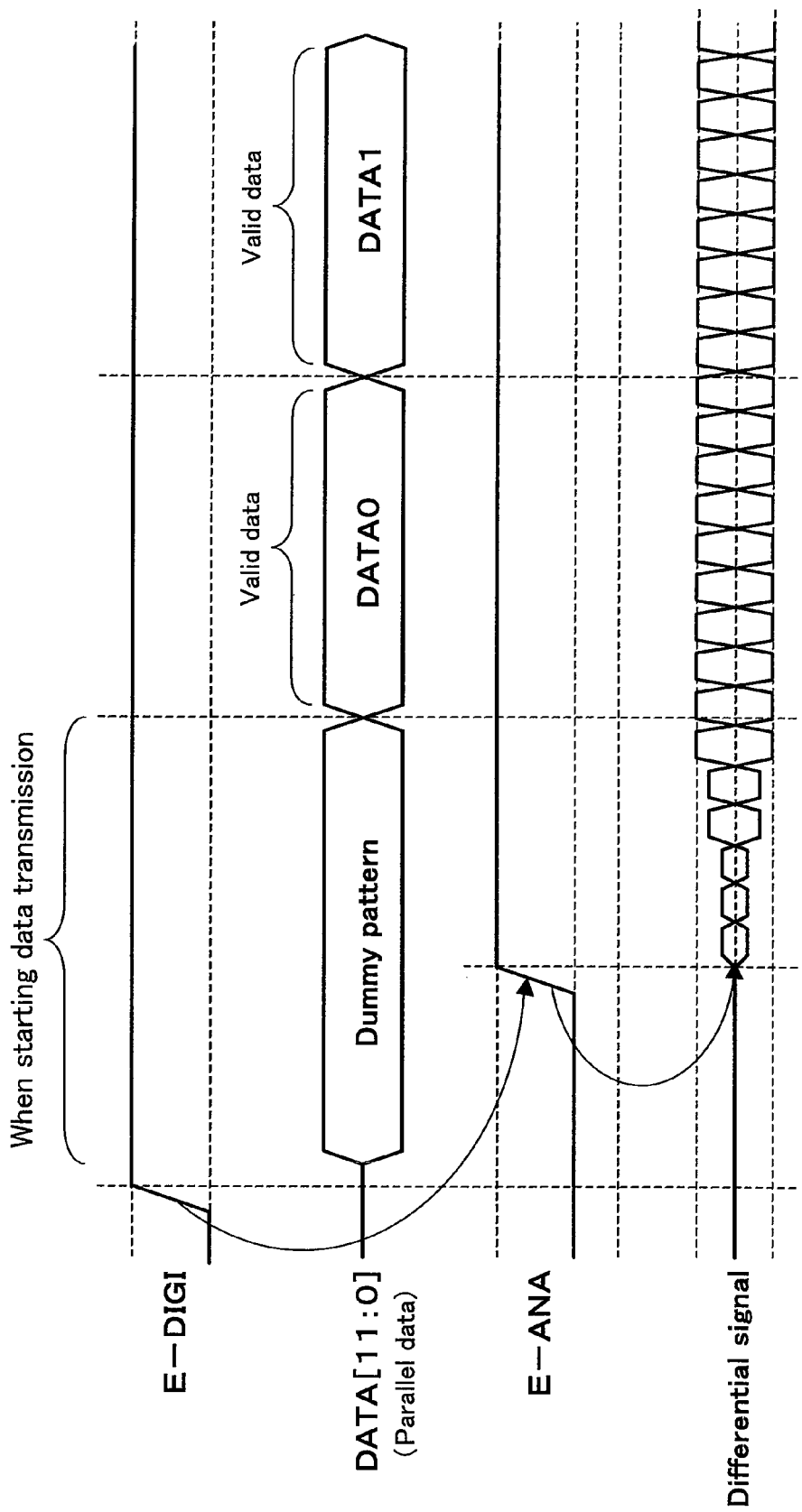
FIG. 16 is a timing diagram illustrating the timing for driving a differential driver.

[Timing for Driving Differential Driver]

Where a differential driver whose operation status can be switched (e.g., a differential driver shown in FIG. 12 or 14) is used, it is preferred that as shown in FIG. 16, the transmission processing section 13 is driven by the control signal E-DIGI, and then the parallel data DATA is given to the transmission processing section 13 so that the transmit data TXD is output therefrom, after which the differential driver is activated by the control signal E-ANA. With such a configuration, it is possible to prevent the differential driver from being driven to thereby fluctuate the potential of the pair of signal lines, when no transmit data TXD is given thereto.

As described above in the various embodiments, the interface circuit of the present invention is capable of transferring more information within a limited amount of time, as compared with a conventional AC-coupled interface circuit, and it is therefore very useful as an interface circuit mounted on a system performing a real-time, bidirectional data transfer. For example, by employing the interface circuit of the present invention, it is possible to implement an automobile driving assisting system in which video signals are transferred to a monitor unit from a plurality of camera units taking images around the automobile, wherein during each video signal blanking period, a control signal is transferred from the monitor unit to the camera units to thereby control, in real time, the operation of the camera units.

While the above description has been directed to an example of an interface circuit to be mounted on a system performing a bidirectional data transfer, the interface circuit of the present invention is of course applicable also to a system performing a unidirectional data transfer.

INDUSTRIAL APPLICABILITY

The interface circuit of the present invention can shorten the stabilization time while preventing LSI breakdown due to ESD, and is therefore useful as an interface circuit mounted on an on-vehicle LSI.

The invention claimed is:

1. An AC-coupled interface circuit on a semiconductor integrated circuit apparatus performing a bidirectional data transfer via a differential transmission line, the AC-coupled interface circuit comprising:

a pair of signal lines configured to transfer a differential signal;

a pair of capacitors configured to AC-couple the pair of signal lines with the differential transmission line;

a resistor element configured to connect the pair of signal lines to each other;

a differential driver including a pair of output terminals connected to the pair of signal lines, wherein in a data transmission operation, the differential driver receives transmit data and converts the transmit data to a differential signal to output the differential signal;

a differential receiver including a pair of input terminals connected to the pair of signal lines, wherein in a data reception operation, the differential receiver receives a differential signal transferred to the pair of signal lines and converts the differential signal to receive data;

a potential setting section configured to set a potential of the pair of signal lines to a predetermined stable potential before the differential signal is transferred to the pair of signal lines; and a feedback control section, wherein when an output of the differential signal by the differential driver is started, the feedback control section detects an amplitude of the differential signal of the pair of signal lines and compares the detected amplitude of the differential signal with a predetermined reference amplitude value so as to control an amount of output current of the differential driver based on a comparison result.

2. An AC-coupled interface circuit on a semiconductor integrated circuit apparatus performing a bidirectional data transfer via a differential transmission line, the AC-coupled interface circuit comprising:

a pair of signal lines configured to transfer a differential signal;

a pair of capacitors configured to AC-couple the pair of signal lines with the differential transmission line;

a resistor element configured to connect the pair of signal lines to each other;

a differential driver including a pair of output terminals connected to the pair of signal lines, wherein in a data transmission operation, the differential driver receives transmit data and converts the transmit data to a differential signal to output the differential signal;

a differential receiver including a pair of input terminals connected to the pair of signal lines, wherein in a data reception operation, the differential receiver receives a differential signal transferred to the pair of signal lines and converts the differential signal to receive data;

a potential setting section configured to set a potential of the pair of signal lines to a predetermined stable potential before the differential signal is transferred to the pair of signal lines;

a potential determination section, wherein when a potential setting operation by the potential setting section is started, the potential determination section detects a potential of the pair of signal lines, and instructs the differential driver to start outputting the differential signal when the detected potential becomes equal to a predetermined reference potential value.

3. An AC-coupled interface circuit on a semiconductor integrated circuit apparatus performing a bidirectional data transfer via a differential transmission line, the AC-coupled interface circuit comprising:
a pair of signal lines configured to transfer a differential signal;
a pair of capacitors configured to AC-couple the pair of signal lines with the differential transmission line;
a resistor element configured to connect the pair of signal lines to each other;
a differential driver including a pair of output terminals connected to the pair of signal lines, wherein in a data transmission operation, the differential driver receives transmit data and converts the transmit data to a differential signal to output the differential signal;
a differential receiver including a pair of input terminals connected to the pair of signal lines, wherein in a data reception operation, the differential receiver receives a differential signal transferred to the pair of signal lines and converts the differential signal to receive data;
a potential setting section configured to set a potential of the pair of signal lines to a predetermined stable potential before the differential signal is transferred to the pair of signal lines;
a transmission processing section configured to output transmit data to the differential driver in the data transmission operation; and
an amplitude determination section, wherein:
the differential driver is configured to start outputting the differential signal so that an amplitude of the differential signal gradually increases, and
when an output of the differential signal by the differential driver is started, the amplitude determination section detects an amplitude of the differential signal of the pair of signal lines, and instructs the transmission processing section to output transmit data representing valid data when the detected amplitude of the differential signal becomes equal to a predetermined prescribed amplitude value.

4. An AC-coupled interface circuit on a semiconductor integrated circuit apparatus performing a bidirectional data transfer via a differential transmission line, the AC-coupled interface circuit comprising:
a pair of signal lines configured to transfer a differential signal;
a pair of capacitors configured to AC-couple the pair of signal lines with the differential transmission line;
a resistor element configured to connect the pair of signal lines to each other;
a differential driver including a pair of output terminals connected to the pair of signal lines, wherein in a data transmission operation, the differential driver receives transmit data and converts the transmit data to a differential signal to output the differential signal;
a differential receiver including a pair of input terminals connected to the pair of signal lines, wherein in a data reception operation, the differential receiver receives a differential signal transferred to the pair of signal lines and converts the differential signal to receive data;
a potential setting section configured to set a potential of the pair of signal lines to a predetermined stable potential before the differential signal is transferred to the pair of signal lines, wherein:
the differential driver is configured to start outputting the differential signal so that an amplitude of the differential signal gradually increases, and
the differential driver includes:
a current supply section configured to supply an output current;
a differential output section configured to receive the transmit data and convert the transmit data to a differential signal having an amplitude according to a current amount of an output current supplied from the current supply section to output the differential signal; and
a driving adjustment section configured to gradually change the current amount of the output current of the current supply section when starting the data transmission operation,
the driving adjustment section includes:
a reference current source which starts outputting a reference current when starting the data transmission operation;
a transistor configured to generate a gate potential according to the reference current from the reference current source; and
a capacitor element one end of which is connected to a gate of the transistor, and
the current supply section supplies an output current of a current amount according to the gate potential of the transistor.

5. An AC-coupled interface circuit on a semiconductor integrated circuit apparatus performing a bidirectional data transfer via a differential transmission line, the AC-coupled interface circuit comprising:
a pair of signal lines configured to transfer a differential signal;
a pair of capacitors configured to AC-couple the pair of signal lines with the differential transmission line;
a resistor element configured to connect the pair of signal lines to each other;
a differential driver including a pair of output terminals connected to the pair of signal lines, wherein in a data transmission operation, the differential driver receives transmit data and converts the transmit data to a differential signal to output the differential signal;
a differential receiver including a pair of input terminals connected to the pair of signal lines, wherein in a data reception operation, the differential receiver receives a differential signal transferred to the pair of signal lines and converts the differential signal to receive data;
a potential setting section configured to set a potential of the pair of signal lines to a predetermined stable potential before the differential signal is transferred to the pair of signal lines, wherein:
the differential driver is configured to start outputting the differential signal so that an amplitude of the differential signal gradually increases, and
the differential driver includes:
a current supply section configured to supply an output current;
a differential output section configured to receive the transmit data and convert the transmit data to a differential signal having an amplitude according to a current amount of an output current supplied from the current supply section to output the differential signal; and
a driving adjustment section configured to gradually change the current amount of the output current of the current supply section when starting the data transmission operation, the driving adjustment section includes:
a reference current source configured to output a reference current;
a first transistor configured to generate a gate potential according to the reference current from the reference current source;
a second transistor configured to generate a drain current according to the gate potential generated by the first transistor;
a plurality of adjustment transistors which are activated one after another to generate drain currents when starting the data transmission operation; and
a third transistor configured to generate a gate potential according to current amounts of the drain currents generated by the second transistor and the plurality of adjustment transistors, and
the current supply section supplies an output current of a current amount according to the gate potential of the third transistor.

6. An AC-coupled interface circuit on a semiconductor integrated circuit apparatus performing a bidirectional data transfer via a differential transmission line, the AC-coupled interface circuit comprising:
a pair of signal lines configured to transfer a differential signal;
a pair of capacitors configured to AC-couple the pair of signal lines with the differential transmission line;
a resistor element configured to connect the pair of signal lines to each other;
a differential driver including a pair of output terminals connected to the pair of signal lines, wherein in a data transmission operation, the differential driver receives transmit data and converts the transmit data to a differential signal to output the differential signal;
a differential receiver including a pair of input terminals connected to the pair of signal lines, wherein in a data reception operation, the differential receiver receives a differential signal transferred to the pair of signal lines and converts the differential signal to receive data;
a potential setting section configured to set a potential of the pair of signal lines to a predetermined stable potential before the differential signal is transferred to the pair of signal lines, wherein:
the differential driver is configured to start outputting the differential signal so that an amplitude of the differential signal gradually increases, and
the differential driver includes:
a current supply section configured to supply an output current;
a differential output section configured to receive the transmit data and convert the transmit data to a differential signal having an amplitude according to a current amount of an output current supplied from the current supply section to output the differential signal;
a driving adjustment section configured to gradually change the current amount of the output current of the current supply section when starting the data transmission operation; and
a preemphasis section which supplies an emphasis current to the differential output section if transmit data given to the differential output section is a transitional bit, and stops supplying the emphasis current if the transmit data is a non-transitional bit.

7. An AC-coupled interface circuit on a semiconductor integrated circuit apparatus performing a bidirectional data transfer via a differential transmission line, the AC-coupled interface circuit comprising:
a pair of signal lines configured to transfer a differential signal;
a pair of capacitors configured to AC-couple the pair of signal lines with the differential transmission line;
a resistor element configured to connect the pair of signal lines to each other;
a differential driver including a pair of output terminals connected to the pair of signal lines, wherein in a data transmission operation, the differential driver receives transmit data and converts the transmit data to a differential signal to output the differential signal;
a differential receiver including a pair of input terminals connected to the pair of signal lines, wherein in a data reception operation, the differential receiver receives a differential signal transferred to the pair of signal lines and converts the differential signal to receive data; and
a potential setting section configured to set a potential of the pair of signal lines to a predetermined stable potential before the differential signal is transferred to the pair of signal lines, wherein:
the differential driver is configured to start outputting the differential signal so that an amplitude of the differential signal gradually increases, and
an operation status of the differential driver can be switched, wherein the differential driver is inactive before the transmit data is given and is active after the transmit data is given.

* * * * *